United States Patent Office 2,824,876
Patented Feb. 25, 1958

2,824,876

PRODUCTION OF 4-MERCAPTONICOTINIC ACID AND INTERMEDIATE THEREFOR

Leon Katz, Springfield, and Murray S. Cohen, Dover, N. J., and William Schroeder, West Lafayette, Ind., assignors to Schenley Industries, Inc., New York, N. Y., a corporation of Delaware No Drawing. Application February 23, 1955
Serial No. 490,136

4 Claims. (Cl. 260—294.8)

The present invention relates to the four isomeric carbohydrazides of mercaptopyridines, the carbohydrazido and mercapto radicals of which are adjacent to each other, and their aldehyde derivatives. These four mercaptopyridine carbohydrazides, whose formulae are represented hereinbelow, are:

I. 2-mercaptonicotinylhydrazide (2-mercapto-3-carbohydrazidopyridine),
II. 3-mercaptoisonicotinylhydrazide (3-mercapto-4-carbohydrazidopyridine),
III. 3-mercaptopicolinylhydrazide (3-mercapto-2-carbohydrazidopyridine), and
IV. 4-mercaptonicotinylhydrazide (4-mercapto-3-carbohydrazidopyridine).

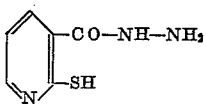

I

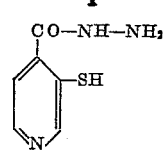

II

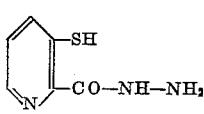

III

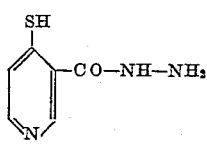

IV

The hydrazones prepared from each of the foregoing mercaptopyridine carbohydrazides by reaction with aromatic aldehydes are also included within the scope of the present invention. These hydrazones differ in formulae from the foregoing hydrazides only in that the carbohydrazido radical is further substituted at the terminal nitrogen atom by a benzylidene or ring-substituted benzylidene radical. All of the compounds of this invention may accordingly be designated generically as mercaptopyridines having adjacent to the mercapto radical a carbohydrazido (—CO—NH—NH$_2$) or a benzylidene-substituted carbohydrazido (—CO—NH—N=R) radical in which R is a benzylidene radical or a benzylidene radical having one or more halogen, hydroxyl, carboxyl, alkyl or alkoxy substituents in the benzene ring.

Although the mercaptopyridine carbohydrazides and their aldehyde derivatives (hydrazones) exhibit less antibacterial and antifungal activity than their corresponding benzene isosteres or prototypes, the pyridine compounds are potentially useful chemotherapeutic agents in the study of cancer and are potentially useful as rodent repellents.

The mercaptopyridine carbohydrazides can be prepared readily from the methyl or other alkyl esters of the corresponding mercaptopyridine carboxylic acids by reaction with hydrazine or a hydrazine-engendering substance in conventional manner. Three of the mercaptopyridine carboxylic acids, namely, 2-mercaptonicotinic acid, 3-mercaptopicolinic acid, and 3-mercaptoisonicotinic acid, are known (E. Sucharda and Miss Troszkiewiczowna, Roczniki Chemji, 1932, vol. 12, pages 493–499). The present application and claims are directed specifically to a method for the preparation of the fourth, 4-mercaptonicotinic acid, which is described in Example 7 hereinafter. Each of these acids is converted to the required methyl ester by treatment with thionyl chloride to form the acyl chloride, followed by reaction of the acyl chloride with methanol, as illustrated in Example 1 hereinafter. Each of the methyl esters, except that of 2-mercaptonicotinic acid, may also be readily prepared by conventional esterification of the acid with methanol in the presence of an acid catalyst such as hydrogen chloride gas, as illustrated in Examples 3, 5 and 7 hereinafter.

In the following examples, typical methods of preparing the compounds and the properties of the compounds are disclosed.

*Example 1.—2-mercaptonicotinylhydrazide (I)*

To a well-cooled mixture of 5 milliliters of pyridine and 3 milliliters of thionyl chloride was added 1.5 grams of 2-mercaptonicotinic acid in small portions so as to maintain the temperature below 50° C. The mixture was allowed to stand for 10 minutes at room temperature, and then 10 milliliters of methanol was added. A vigorous reaction ensued and the mixture was cooled in ice water to maintain the temperature below 50° C. After the reaction had subsided, the solution was warmed on a steam bath for 10 minutes. Fifty (50) milliliters of water and sufficient sodium bicarbonate were then added to bring the solution to slight alkalinity and, on cooling, 1.1 grams of the crude ester, having a melting point of 185–190° C. (204° reported in the literature) was separated by suction filtration.

Without further purification, the 1.1 grams of crude methyl 2-mercaptonicotinate was dissolved in 10 milliliters of ethanol and 3 milliliters of hydrazine hydrate (64% aqueous hydrazine solution) was added. The solution was heated on a steam bath for 30 minutes while allowing most of the ethanol to evaporate. The residue was diluted with water and neutralized with acetic acid, whereupon yellow crystals separated. After cooling in an ice bath, the precipitated crystals were separated by filtration, washed with cold water and dried at 60° C. The yield was 1.1 grams and, on recrystallization from a mixture of dimethylformamide and ethanol, the crystals had a melting point of 330° C. and their elemental analysis conformed closely to that calculated for $C_6H_7N_3OS$.

*Example 2*

2,4-dichlorobenzylidene-2 - mercaptonicotinylhydrazide having the formula:

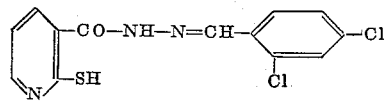

This compound was prepared from the 2-mercaptonicotinylhydrazide of Example 1, by reaction with 2,4-dichlorobenzaldehyde in solution in methanol containing acetic acid, and was recovered in accordance with the procedure more fully described in Example 4 hereinafter. Recrystallization of the product from a mixture of dimethylformamide and methanol yielded yellow needle-like crystals having a melting point of 265–267° C. whose elemental analysis for carbon and hydrogen conformed closely to that calculated for $C_{13}H_9Cl_2N_3OS$.

The 3,3'-dithioisonicotinic and 3,3'-dithiopicolinic acids used in the following two preparations (Examples 3 and 5) were prepared by a modification of the method described by Sucharada and Troszkiewiczowna, loc. cit., namely, by diazotization of the requisite aminopyridine carboxylic acids and reaction of the diazonium salts with potassium ethyl xanthate (instead of with an alkaline sodium polysulfide solution) and subsequent hydrolysis of the resulting xanthate esters. The products were identical with those described heretofore, although the crude products that were used had slightly lower melting points than those reported for the purified compounds.

*Example 3.—3-mercaptoisonicotinylhydrazide (II)*

A slurry of 29 grams (0.093 mole) of 3,3'-dithioisonicotinic acid (M. P. 305–308° C.) and 1500 milliliters of methanol was refluxed for 7½ hours while passing in a stream of hydrogen chloride gas. All of the acid dissolved during the first 3 hours of refluxing. One liter of methanol was then distilled off and the reaction mixture was cooled, causing the separation of 18 grams of product, which was collected by filtration. A second crop of dimethyl 3,3'-dithioisonicotinate amounting to 5 grams was obtained by dilution of the filtrate with ether; these 5 grams were recovered by filtration. Evaporation of this filtrate left 10 grams of a crude semisolid ester which was used in the following step of the preparation. The total crude yield was 32 grams. Recrystallization of the second crop from a mixture of methanol and acetone gave light yellow needle-like crystals of the hydrochloride having a melting point of 166–167° C. with decomposition. Elemental analysis of the hydrochloride for carbon, hydrogen and nitrogen gave values conforming closely to that calculated for $C_{14}H_{14}Cl_2N_2O_4S$.

A mixture of 10 grams of the crude fraction of dimethyl 3,3'-dithioisonicotinate prepared above and 20 milliliters of hydrazine hydrate (64% solution) was refluxed for 3 hours. Dilution of the reaction mixture with an equal volume of water, neutralization with concentrated hydrochloric acid, and cooling in an ice bath for ½ hour, afforded 5 grams of 3-mercaptoisonicotinylhydrazide which, after recrystallization from water, had a melting point of 239–240° C. and an elemental analysis for carbon, hydrogen and nitrogen closely conforming to that calculated for $C_6H_7N_3OS$.

*Example 4*

2,4 - dichlorobenzylidene - 3 - mercaptoisonicotinylhydrazide having the formula:

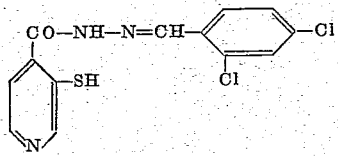

To a boiling solution of 1.69 grams (0.01 mole) of 3-mercaptoisonicotinylhydrazide (Example 3) in a mixture of 100 milliliters of methanol and 3 milliliters of acetic acid was added 2.0 grams (0.012 mole) of 2,4-dichlorobenzaldehyde. Orange crystals began to separate almost immediately. After 5 minutes the mixture was chilled and the solids were separated by filtration. The yield was 2.65 grams (82% of the stoichiometrical) and the product, after 3 recrystallizations from pyridine, separated as orange crystals having a melting point of 239–241° C. and an elemental analysis for carbon and hydrocarbon closely conforming to that calculated for $C_{13}H_9Cl_2N_3OS$.

On treatment with a stoichiometrical amount of iodine in pyridine, the disulfide of the foregoing compound was formed. When recrystallized from dimethylformamide, the disulfide separated in yellow fibrous needle-like crystals having a melting point of 264–265° C. and an elemental analysis for carbon and hydrogen that conformed to that calculated for $C_{26}H_{16}Cl_4N_6O_2S_2$.

*Example 5.—3-mercaptopicolinylhydrazide (III)*

A solution of 13.5 grams (0.044 mole) of 3,3-dithiopicolinic acid (M. P. 190–193° C.) in 500 milliliters of methanol was refluxed for 15 hours while passing in a stream of hydrogen chloride gas. The residue, after evaporation of the methanol on a steam bath, was triturated with sodium bicarbonate solution and the insoluble dimethyl 3,3'-dithiopicolinate was separated by filtration. After washing with water and drying at 50° C., the white crystalline product weighed 10.5 grams (71% of the stoichiometric yield) and had a melting point of 195–200° C., which was raised to 210–212° C. when the product was recrystallized from methanol. Its elemental analysis for carbon and hydrogen conformed closely to that calculated for $C_{14}H_{12}N_2O_4S_2$.

Twelve grams of the foregoing dimethyl 3,3'-dithiopicolinate was mixed with 25 milliliters of hydrazine hydrate (64% hydrazine solution). Heat was evolved and, when the reaction slackened, the mixture was refluxed for an additional 10 minutes. After cooling, the solution was diluted with 20 milliliters of water and treated with decolorizing charcoal. The product did not separate upon neutralization of the solution with acetic acid, but the addition of 40 milliliters of concentrated hydrochloric acid and subsequent cooling caused the separation of orange platelets of the hydrochloride of 3-mercaptopicolinylhydrazide, which were collected and washed with a mixture of isopropanol and ether. The yield was 4–5 grams (31% of the stoichiometric) and the melting point of the product was 310° C., which remained unchanged after the product was recrystallized from methanol. The carbon and hydrogen elemental analysis conformed closely to that calculated for $C_6H_8ClN_3OS$. From this hydrochloride, the hydrazide can be obtained by neutralization with alkalies.

*Example 6*

2,4 - dichlorobenzylidene - 3 - mercaptopicolinylhydrazide having the formula:

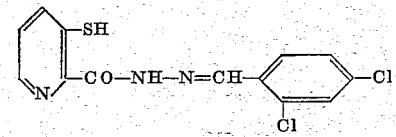

The hydrochloride of 3-mercaptopicolinylhydrazide (Example 5) was dissolved in aqueous ethanol, the solution was neutralized by the addition of sodium hydroxide solution, and an excess over the stoichiometric amount of 2,4-dichlorobenzaldehyde was added. The mixture was boiled for a few minutes and the product was recovered as in Example 4 hereinbefore. Recrystallization of the product from a mixture of pyridine, acetic acid and water, yielded orange-colored crystals having a melting point of 195–197° C. whose elemental analysis for carbon and hydrogen conformed closely to that calculated for $C_{13}H_9Cl_2N_3OS$.

*Example 7.—4-mercaptonicotinic acid and 4-mercaptonicotinylhydrazide (IV)*

A mixture of 2.8 grams (0.02 mole) of 4-hydroxynicotinic acid, 5.0 grams (0.022 mole) of phosphorus pentasulfide and 30 milliliters of pyridine was heated under reflux for 1½ hours. When the reaction mixture was poured into 50 milliliters of hot (70–80° C.) water, a vigorous evolution of gas ensued and an orange-red solid precipitated. The mixture was then chilled at 10° C. for 2 hours and the separated solid was collected and dried at 65° C. It had a weight of 1.75 grams, corresponding to 48% of the stoichiometric yield, and had a melting point of 198–202° C. A sample recrystallized from a small amount of dimethylformamide and then from pyridine, separated as orange-red-colored rhombs having a melting point of 206–208° C. and an elemental analysis that conformed to that calculated for $C_6H_6NS_3$. Its molecular weight, determined ebullioscopically in glacial acetic acid in two separate determination, was 237 and 238, which is in agreement with a calculated molecular weight for the acetate of 5-aza-1,2,3-benzodithiole-3-thione, the acetate of the compound whose formula is represented below in the equation.

A mixture of 13 grams (0.070 mole) of the 5-aza-1,2,3-benzodithiole-3-thione thus prepared, 100 grams of sodium hydroxide and 185 milliliters of water was refluxed for 16 hours. The resulting mixture was cooled and acidified wtih concentrated hydrochloric acid, thereby precipitating a mixutre of elemental sulfur and 4-mercaptonicotinic acid, which was collected and extracted with sodium bicarbonate solution. Acidification of the sodium bicarbonate extract yielded 7.1 grams of light yellow-colored crystals of 4-mercaptonicotinic acid having a melting point of 235–237° C. On recrystallizing the product twice from water, its melting point was raised to 236–238° C. The elemental analysis of the product conformed closely to that calculated for $C_6H_5NO_2S$.

The preparation of 4-mercaptonicotinic acid by the foregoing method may accordingly be represented as follows:

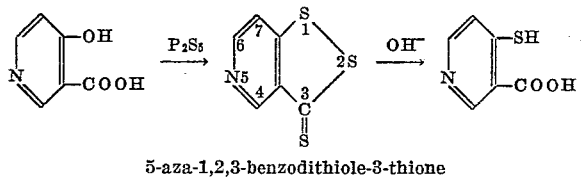

5-aza-1,2,3-benzodithiole-3-thione

A mixture of 1.5 grams of 4-mercaptonicotinic acid and 20 milliliters of methanol was saturated at prevailing room temperature with hydrogen chloride gas and the mixture was refluxed for 2½ hours until a clear solution resulted. The excess methanol was then evaporated on a steam bath. The residue was treated with water and neutralized with sodium bicarbonate and the methyl ester thus formed was collected, washed with water and dried, yielding 1.2 grams of yellow crystals having a melting point of 165° C., which was raised to 170–171° C. by recrystallization of the product from water.

The methyl 4-mercaptonicotinate thus prepared was reacted with hydrazine hydrate to convert it to the hydrazide by heating on a steam bath for 10 minutes. From 1.0 gram of ester, 0.9 gram of the hydrazide, having a melting point of 302–305° C. after softening at 230° C., was obtained. On recrystallization of the hydrazide from water, yellow needles having a melting point of 304–305° C. were obtained. The elemental analysis of the product for carbon conformed closely to that calculated for $C_6H_7N_3OS$.

Example 8

2,4 - dichlorobenzylidene-4-mercaptonicotinylhydrazide having the formula:

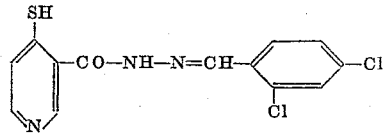

The foregoing hydrazone was prepared from 2,4-dichlorobenzaldehyde and 4-mercaptonicotinylhydrazide in the same manner as described in Example 4 hereinbefore. On recrystallization from a mixture of dimethylformamide and methanol, the product in the form of yellow needle-like crystals, had a melting point of 254–255° C. Its elemental analysis for carbon and hydrogen conformed closely to that calculated for $C_{13}H_9Cl_2N_3OS$.

Inasmuch as the foregoing specification comprises preferred embodiments of the invention, it is to be understood that the invention is not restricted thereto and that variations and modifications can be made therein in conventional manner without departing from the invention, whose scope is to be limited solely by the appended claims.

We claim:

1. A process for the production of 4-mercaptonicotinic acid which comprises the reaction of 4-hydroxynicotinic acid with phosphorus pentasulfide to form 5-aza-1,2,3-benzodithiole-3-thione, alkaline hydrolysis of the resulting compound, and subsequent re-recovery of 4-mercaptonicotinic acid from the hydrolyzate.

2. A process for the production of 4-mercaptonicotinic acid which comprises heating together approximately equimolecular proportions of 4-hydroxynicotinic acid and phosphorus pentasulfide, recovering the 5-aza-1,2,3-benzodithiole-3-thione thus formed, subjecting that product to alkaline hydrolysis, and subsequently recovering from the hydrolyzate the 4-mercaptonicotinic acid.

3. A process for the production of 4-mercaptonicotinic acid which comprises the hydrolysis of 5-aza-1,2,3-benzodithiole-3-thione in an aqueous solution of an alkali, and subsequently recovering the 4-mercaptonicotinic acid therefrom.

4. 5-aza-1,2,3-benzodithiole-3-thione.

References Cited in the file of this patent

Fiebel et al.: JACS, vol. 70, p. 3908 (1948).